United States Patent
Tence et al.

(10) Patent No.: US 6,958,165 B2
(45) Date of Patent: Oct. 25, 2005

(54) PUFF PASTRY BISCUIT FOR REFRIGERATED OR FROZEN FOOD PRODUCT

(75) Inventors: Jean-Francois Tence, Coye la Forêt (FR); Ana Miskovic, La Paz entre Rios (AR); Sylvie Penet, Warluis (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 10/320,770

(22) Filed: Dec. 17, 2002

(65) Prior Publication Data

US 2003/0113426 A1 Jun. 19, 2003

Related U.S. Application Data

(63) Continuation of application No. PCT/EP01/06756, filed on Jun. 14, 2001.

(30) Foreign Application Priority Data

Jun. 19, 2000 (EP) .............................................. 00202124

(51) Int. Cl.$^7$ .............................................. A21D 13/00
(52) U.S. Cl. ........................... 426/94; 426/99; 426/100; 426/101; 426/139; 426/293; 426/302; 426/496
(58) Field of Search .......................... 426/293, 94, 100, 426/101, 139, 496, 283, 302

(56) References Cited

U.S. PATENT DOCUMENTS

| | | | |
|---|---|---|---|
| 3,537,866 A | 11/1970 | Weller et al. | 99/180 |
| 5,843,512 A | 12/1998 | Daouse et al. | 426/512 |
| 6,174,157 B1 | 1/2001 | Daouse et al. | 425/218 |
| 6,177,112 B1 | 1/2001 | Dufort et al. | 426/95 |
| 6,503,546 B1 * | 1/2003 | Ferrari-Philippe et al. | 426/94 |

FOREIGN PATENT DOCUMENTS

| | | |
|---|---|---|
| EP | 0 104 743 A2 | 4/1984 |
| EP | 0 733 308 A2 | 9/1996 |
| EP | 0 954 977 A1 | 11/1999 |

* cited by examiner

Primary Examiner—Lien Tran
(74) Attorney, Agent, or Firm—Winston & Strawn LLP

(57) ABSTRACT

A thin puff dough biscuit for a refrigerated or frozen food product. The biscuit has a laminar structure containing 6 to 10 sheets of puff dough and a maximum thickness of at most 2 mm. The biscuit is baked between two heated surfaces so as to prevent the development of the puff dough, and it is coated with a composition, in particular a fatty composition, which serves as a moisture barrier. This biscuit serves as an inclusion or an annex in a composite frozen cake that has at least one layer of the preceding biscuit included in a mass of cream and in which the layers of biscuit are separated from each other by layers of cream.

12 Claims, 2 Drawing Sheets

PUFF PASTRY BISCUIT FOR REFRIGERATED OR FROZEN FOOD PRODUCT

CROSS-REFERENCE TO RELATED APPLICATIONS

This application is a continuation of the US national stage designation of International application PCT/EP01/06756 filed Jun. 14, 2001, the entire content of which is expressly incorporated herein by reference thereto.

TECHNICAL FIELD

The invention relates to a thin puff dough biscuit, the process for its manufacture and a cake, in particular a frozen cake, containing such a biscuit.

BACKGROUND ART

Products based on commercial ice cream in which whole biscuits are present are generally sandwiches. The biscuits cover the bottom and top surfaces of the ice cream, partially or completely. These biscuits are in general very dry to confer on them the stiffness and the mechanical resistance which are necessary for their processing on a production line. The faces of the biscuits in contact with the ice cream are not generally covered with a fatty layer serving as a barrier to the transfer of moisture. Consequently, they rapidly become moist and become soft. This change is advantageous when a low contrast in texture between the ice cream and the biscuit is sought, which is for example the case in a sandwich which should be capable of being cut through its full thickness without crushing the central layer of ice cream.

Recently, ice cream cakes comprising crunchy biscuits as inclusions have appeared on the market. Compared to the sandwich, a contrast in texture between the biscuit and the ice cream is permanently sought. In this case, the biscuit should have a much better resistance to moisture regain than that commonly used in the manufacture of sandwiches. That is all the more necessary as both faces of the biscuit are in contact with the ice cream.

It has been proposed, for example in EP-A-0 954 977, to use oriental-type biscuits manufactured from brick dough or filo dough. Although such types of biscuits solve the problem of maintaining crunchiness in the presence of ice cream, their manufacture, while it is common from a craft industry point of view, is complex to carry out on an industrial scale. These biscuits have in addition the disadvantage of being either fragile or soft and are therefore particularly delicate to handle.

In U.S. Pat. No. 5,405,626, it has been proposed to solve the problem of the moisture regain by biscuits having a crunchy character intended for products based on filled puff dough, for example of the "Apfelstrudel" type by making available a composite dough. The latter consists of a layer of developed puff dough combined with a shortcrust-type dough which serves as an anchoring layer for a moisture barrier layer, both dough layers, prepared separately, then being co-laminated and then baked, and the barrier layer then being deposited on the anchoring layer.

While these have some utility, improvements in these type products are desired, and these improvements are provided by the present invention.

SUMMARY OF THE INVENTION

The present invention provides a biscuit which is simple to manufacture and is capable of retaining a particularly crunchy texture during storage in the frozen state in the presence of ice cream, as well as in the distribution network and during consumption.

The puff dough biscuit of the invention advantageously has a laminar structure containing 6 to 10 sheets of puff dough, and a thickness of at most 2 mm. The biscuit is baked between two heated surfaces so as to prevent the development of the puff dough, and it is coated with a composition which serves as a moisture barrier.

Compared with a conventionally manufactured developed baked puff dough, the present biscuit is characterized by a remarkable crunchiness or crunchy character without the brittleness or softness of a conventional baked puff dough. Also, the biscuit is capable of withstanding moisture pickup from moist fillings that come into contact with the coated surface when the biscuit and a moist filling, such as one that contains cream, are held in a refrigerated or frozen state so that crunchiness or crunchy character of the biscuit is maintained for more than one month.

The invention also relates to products made with the novel biscuit of the invention. In particular, the invention discloses a frozen or refrigerated food product comprising at least one biscuit as defined herein and a filling that contains moisture and is in contact with the moisture barrier surface of the biscuit. A particularly preferred product is a refrigerated or frozen cake comprising several layers of such biscuits in a mass of a filling that comprises cream, wherein the layers are separated from each other by the filling.

The invention also relates to a process for manufacturing such a biscuit, in which puff dough strips are prepared. In this process, the strips are laminated in several passes to a thickness of at most 2 mm, the dough is cut into pieces, the pieces of laminated puff dough are baked between two heated surfaces so as to prevent its development, the pieces are cooled, and the cooled pieces are coated with a composition which serves as a moisture barrier.

BRIEF DESCRIPTION OF THE DRAWING FIGURES

DETAILED DESCRIPTION OF THE PREFERRED EMBODIMENTS

Figure 1:
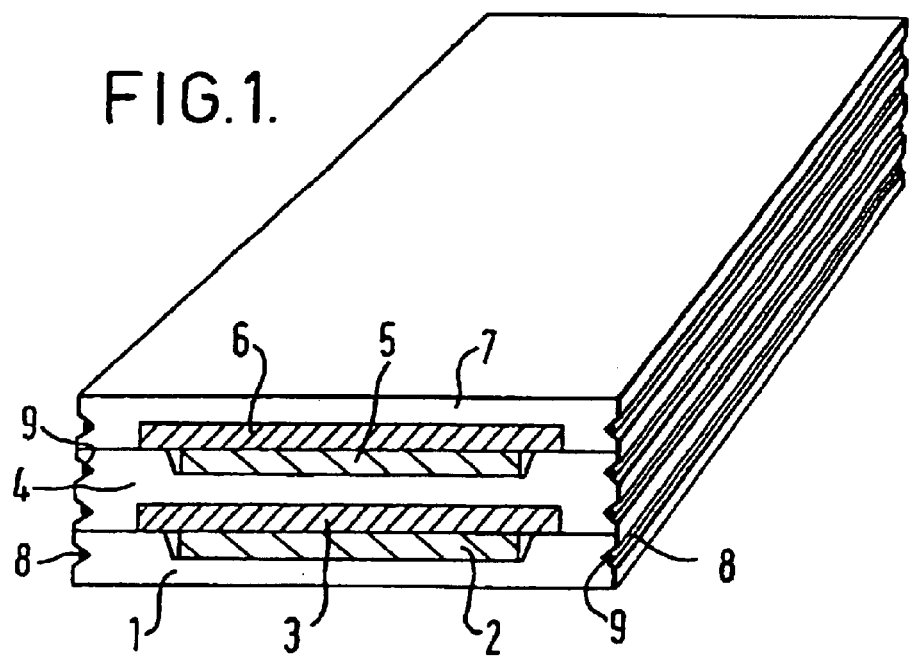
FIG. 1 is a schematic, cross-sectional and perspective view of a frozen cake according to the invention, in which the top decoration of the cake has been omitted for the sake of simplicity.

To carry out the process of the invention, a dough for puff pastry is first prepared from flour, water, sugar and salt. The amounts of these ingredients is not critical and any conventional puff pastry formulation can be used. This dough is kneaded, preferably in a conventional manner, and then divided into blocks which are treated in an extruder in order to form a strip of pastry dough of a conventional size for such applications. This strip is rolled out, it is cut into two smaller strips of equal width and these smaller strips are placed one on top of the other. A puff pastry margarine is applied to the center of the strips which strips are then laminated to form the final structure. After laminating, the strips are cut into pieces.

The pieces are then baked flat in an oven between heated plates maintained at a certain distance from each other so as to avoid the development of the dough while maintaining its puff character. The plates have sufficient rigidity to withstand the expanding dough and maintain the original spaced configuration. Baking can take place for 10 to 30 min at 170–220° C., preferably at about 200–220° C. for about 10 to 20 min depending on the baking device used.

It is also possible to roll the pieces around a mandrel constituting a male element, which may be for example of conical or cylindrical shape in order to give them a shape and to bake them between the two heated elements, one being male and the other, which is complementary, being female while maintaining a gap so as to avoid the development of the puff dough during baking. The mandrel also has sufficient rigidity to withstand the expanding dough and maintain the original spaced configuration.

As barrier composition, there is advantageously used a white base containing mainly a fatty substance, preferably one that is partially hydrogenated, with, where appropriate and as minor components, skimmed milk powder and sugar.

Preferably, the fat used has the property of being solid in a cold or ambient state and of melting rapidly in the mouth and has, to this effect, a percentage of solid fat (solid fat index, SFI) which is low, for example, on the order of 2% by weight, at 35° C., and relatively high, for example greater than 60% by weight, at 10° C.

The coating composition may advantageously also comprise an emulsifier and an acidity regulator.

The invention also relates to a refrigerated cake, and in particular a frozen cake, comprising at least one layer of the preceding biscuit included in a mass of cream, and in which, when there are several layers of biscuit, they are separated from each other by layers of cream.

Such a cake can thus resemble a mille-feuilles. In this cake, the layers of biscuit may be apparent or completely surrounded by a mass of cream. If desired, the cream may contain any one or a wide variety of edible inclusions.

The cake may have, on its top face and/or on its sides, attractive decorative elements, for example in the form of strips, a check pattern, wavy lines, as a fatty composition, for example as a chocolate or as a covering or as a sweetened composition for icing, flavored and colored, conferring a visual and taste contrast with the mass of cream.

In general, the cake exhibits characteristics providing, by virtue of the presence of the layers of crunchy biscuit between layers of soft cream, a contrast in texture which is particularly appreciated by consumers.

It is manufactured by continuous successive extrusion of assembled superposed layers of ice cream and deposition of pieces of biscuit between the layers of ice cream and side and, where appropriate, top decoration, followed by cutting of the assembly into portions. The decoration may be made on the continuous assembled strip at the same time as the extrusion before cutting of the portions or upon the cut portions.

EXAMPLES

The examples below illustrate the invention with the aid of the accompanying drawings. In these examples, the parts and percentages are by weight, unless otherwise stated.

Example 1

A puff dough biscuit is manufactured according to a method derived from that commonly used in industrial pastry manufacture for puff dough cakes.

Kneading

A dough is first of all kneaded in a spiral kneader, in batch quantities, of the KEMPER type for 4 to 10 min, in particular for about 6 min. The typical composition of the dough, whose formula is traditional, is the following:

| Ingredient | % |
| --- | --- |
| Flour | 61.14 |
| Sugar | 30.57 |
| Salt | 0.98 |
| Water | 7.31 |

The presence of sugar facilitates the work of laminating by reducing the elasticity of the dough and allows the development of a biscuit flavor during baking.

Laminating

A FRITSCH line equipped with a centralized computer controlled system is used which allows optimum adjustment of the parameters and ensures high reproducibility.

After kneading, in batch quantities, the dough is rested for about 15 min, which is necessary for the relaxation of the gluten network which facilitates the process by reducing the elasticity. It is then divided into blocks of 10 to 15 kg with which the extruder having a flat nozzle is fed. A strip of dough having a width of 600 mm and a thickness of 20 mm comes out of the extruder. This strip is rolled out to 16.5 mm and the edges are cut so as to bring the width thereof to 620 mm. The scraps produced by the cutting can be recycled to the extruder supply point.

The dough strip is then cut into two equal strips having a width of 310 mm. The two dough strips are superposed and puff pastry margarine is applied between the two dough strips, at the centre over a width of 190 mm and a thickness of 9 mm. A fat/dough ratio of about 0.14 is thus obtained.

After two successive passes between satellite rollers and calibrators, the preceding stack is brought to a total thickness of 5 to 6 mm. The layer of puff dough thus obtained is then folded once such that 4 to 5 folds overlap in one place, which corresponds to 15 folds per linear meter. The puff dough is subjected to a third and final pass through a set of satellite rollers and calibrators which give it the final thickness of only 1.5 mm. It is cut longitudinally and transversely into 60×113 mm pieces which, after baking, will retract to 60×105 mm.

The particular manner of arranging the laminating tools on the line and the use of a laminating line with computer control of the parameters makes it possible to obtain pieces which are as thin as 1.5 mm before baking. If a conventional line with, for example, 2 folds is used, the thickness of the pieces before baking can hardly be adjusted to a value of <2.5 to 3 mm, which limits the potential use of such a puff dough in an article of ice cream.

Baking

The puff dough pieces having a thickness of 5–6 mm are baked in a mould consisting of two plates of 600×800 mm provided with a non-stick coating on the faces in contact with the dough. The gap, that is to say the distance between the two plates is set at 2–2.5 mm so as to prevent the dough from rising and from developing during baking. A thin biscuit galette is thus obtained whose thickness is that of the gap, and which is flat on each face, and which is well suited to subsequent use as an annex or an inclusion in ice cream. Indeed, it is rigid, solid enough to be transported and handled, crunchy between the teeth and has nevertheless a puff texture upon tasting.

To arrive at this result, the dough pieces are baked in a linear oven having moulds of the waffle iron type or in a rotary oven provided with a carriage supporting mould and countermould sets. It is also possible to use a Tefloned band oven by carrying out the baking between two heated bands. The pieces are baked at about 220° C. for about 10 to 20 min depending on the baking device used, which gives them a nice golden color and a particularly crunchy character.

Coating

The baked puff dough biscuit pieces cannot be used as they are as an annex or an inclusion in ice cream. Without protection, they would regain moisture too rapidly and lose their crunchiness within 15 to 30 d. With the fatty coating, the biscuits retain do not lose their crunchiness for over 1 month even if in contact with ice cream during that time.

The biscuits are covered with a layer of fatty coating whose plasticity is adjusted in order to avoid it cracking between −30 and +4° C. Typically, the lipid part of the coating composition is a partially hydrogenated vegetable fat whose melting point is about 32° C. and whose solid fraction (SFI, solid fat index) corresponds to:

2% at 35° C.,
4% at 30° C.,
35% at 20° C., and
65% at 10° C.

The coating composition itself is a mixture of the above vegetable fat, skimmed milk powder and sugar containing an emulsifier and an acidity regulator.

It is possible to apply the above white coating composition in the liquid state by coating, dipping or spraying over the pieces, being careful so that they are perfectly covered both on their faces and on their edge(s). It is possible to add a coloring agent to the coating composition in order to give it a color similar to that of the biscuit.

Example 2

As shown in FIG. 1, the cake viewed in cross section comprises, successively from the bottom to the top, a U-shaped layer 1 of vanilla ice cream (Nata), having a thickness of about 5 mm in its thinnest part, inside the U of the layer 1, a puff dough biscuit in the form of a coated galette 2, having a thickness of about 5 mm, a layer 3 of chocolate ice cream having a thickness of about 5 mm, an H-shaped layer 4 of Nata ice cream, having a thickness of about 5 mm in its thinnest part, the bottom part of the H containing the layer 3, a puff dough biscuit in the form of a coated galette 5, having a thickness of about 5 mm, deposited in the top part of the H of the layer 4, a layer 6 of chocolate ice cream having a thickness of about 5 mm, an inverted U-shaped layer 7 of Nata ice cream, having a thickness of about 5 mm in its thinnest part, the layer 6 being contained in the bottom part of the inverted U of the layer 7, and decorative chocolate strips 8 deposited in the side grooves 9 of the layers 1, 4 and 7.

Figure 2:
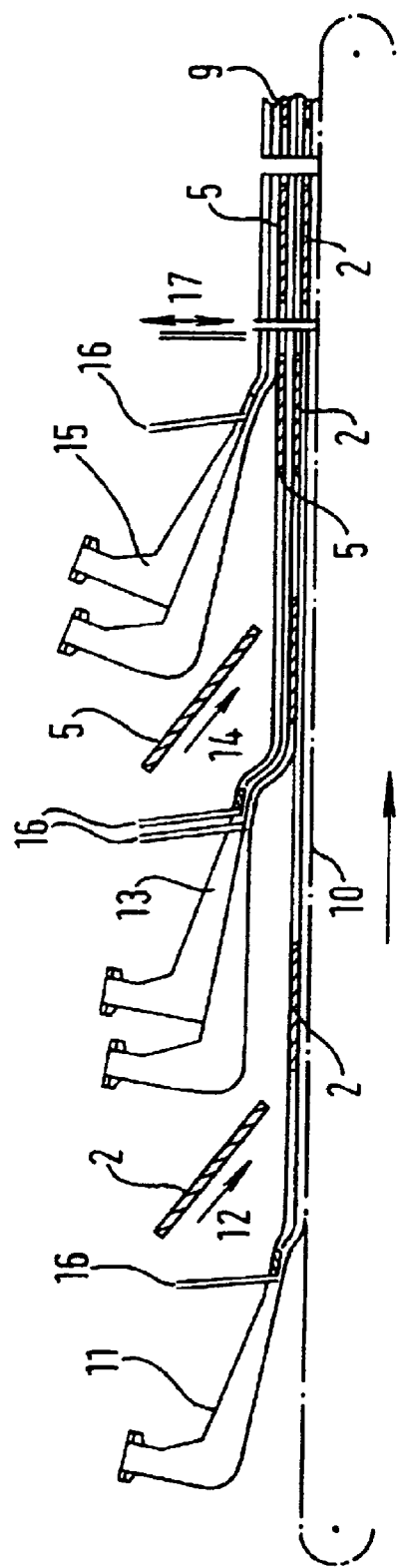
FIG. 2 is a schematic view of a line for manufacturing the cake of FIG. 1.

In FIG. 2, the various layers are extruded from nozzles arranged successively and they are placed on a conveyor belt 10. Thus, the U-shaped layer 1 is first formed and deposited by the single nozzle 11, the biscuit 2 is inserted at 12, the layers 3 and 4 are coextruded by the double nozzle 13, the biscuit 5 is inserted at 14, then the layers 6 and 7 are deposited by the double nozzle 15. The outlets of the nozzles have shapes such that at the same time as the layers 1, 4 and 7 are formed, grooves 9 are made in their sides. The tubes 16 associated with the nozzles 11, 13 and 15 deposit the decorative strips 8. At 17, the portions are cut by a heated wire.

Figure 3:
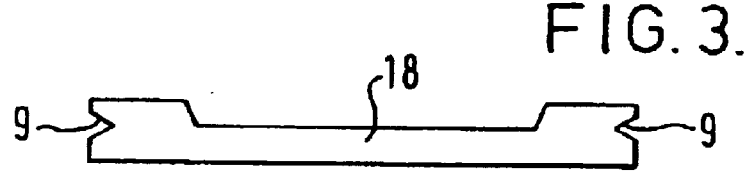
FIGS. 3, 4 and 5 are sections showing the shapes of the outlet orifices of the extrusion nozzles.
Figure 4:
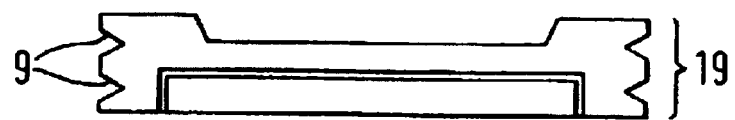
Figure 5:
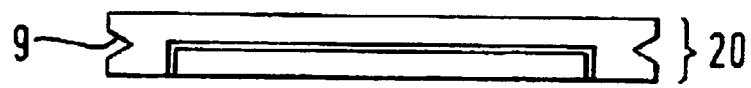

For ease of understanding, FIGS. 3, 4 and 5 show the shapes of the outlet orifices 18, 19 and 20 of the nozzles 11, and 15, respectively.

What is claimed is:

1. A process for manufacturing a dough biscuit, which comprises:

preparing a strip of puff dough comprising an amount of sugar sufficient to facilitate laminating by reducing dough elasticity, and having a thickness of at most 2 mm;

baking the puff dough strip for 10 to 30 mm at 170–220° C. between two heated surfaces so as to prevent development of a puff dough during baking and to impart crunchiness to the baked dough; and coating at least one surface of the baked dough strip with a composition that is solid but melts rapidly in a person's mouth and serves as a moisture barrier.

2. The process of claim 1 which further comprises laminating a plurality of dough strips together to obtain the desired thickness.

3. The process of claim 2 which further comprises cutting the laminated strip into pieces prior to baking.

4. The process of claim 3 which further comprises cooling the cooked dough pieces prior to applying the moisture barrier composition.

5. The process of claim 2, wherein the puff dough is prepared by mixing flour, water, sugar and salt, kneading, and dividing into blocks, and which further comprises extruding the blocks to form a strip, cutting the strip into two strips of equal width, placing one strip on top of the other with puff pastry margarine applied therebetween and then laminating the strips to one having the desired thickness.

6. The process of claim 1, which further comprises baking the dough strip(s) about 10 to 20 min at about 200–220° C.

7. The process of claim 1 wherein all outer surfaces of the biscuit are coated with the moisture barrier composition.

8. The process of claim 1, wherein a filling is associated with the biscuit.

9. The process of claim 8 wherein the filling comprises cream, and the biscuit withstands moisture pickup from the cream filling while the biscuit and filling are held in a refrigerated or frozen state so that the biscuit maintains a crunchy character for over one month.

10. The process of claim 9 wherein several layers of biscuits and filling are provided to form a cake and wherein the biscuits are separated from each other by the filling.

11. The process of claim 1, wherein the moisture barrier composition comprises a fatty substance that has a sufficient plasticity to avoid cracking of the moisture barrier at a temperature between −30° C. to +4° C.

12. The process of claim 1, wherein the amount of sugar present is sufficient to enhance the development of a biscuit flavor during baking.

* * * * *

UNITED STATES PATENT AND TRADEMARK OFFICE
CERTIFICATE OF CORRECTION

PATENT NO. : 6,958,165 B2
DATED : October 25, 2005
INVENTOR(S) : Tence et al.

It is certified that error appears in the above-identified patent and that said Letters Patent is hereby corrected as shown below:

Column 6,
Line 20, after "baking the puff dough strip for 10 to 30" delete "mm" and insert -- min. --.
Line 43, after "the dough strip(s)" insert -- for --.

Signed and Sealed this

Third Day of January, 2006

JON W. DUDAS
*Director of the United States Patent and Trademark Office*